Nov. 4, 1969   D. C. EISENDRATH   3,476,137
CONTROLLED CHEMICAL FEEDER WITH ANTIDIFFUSION MEANS
Filed Sept. 15, 1967
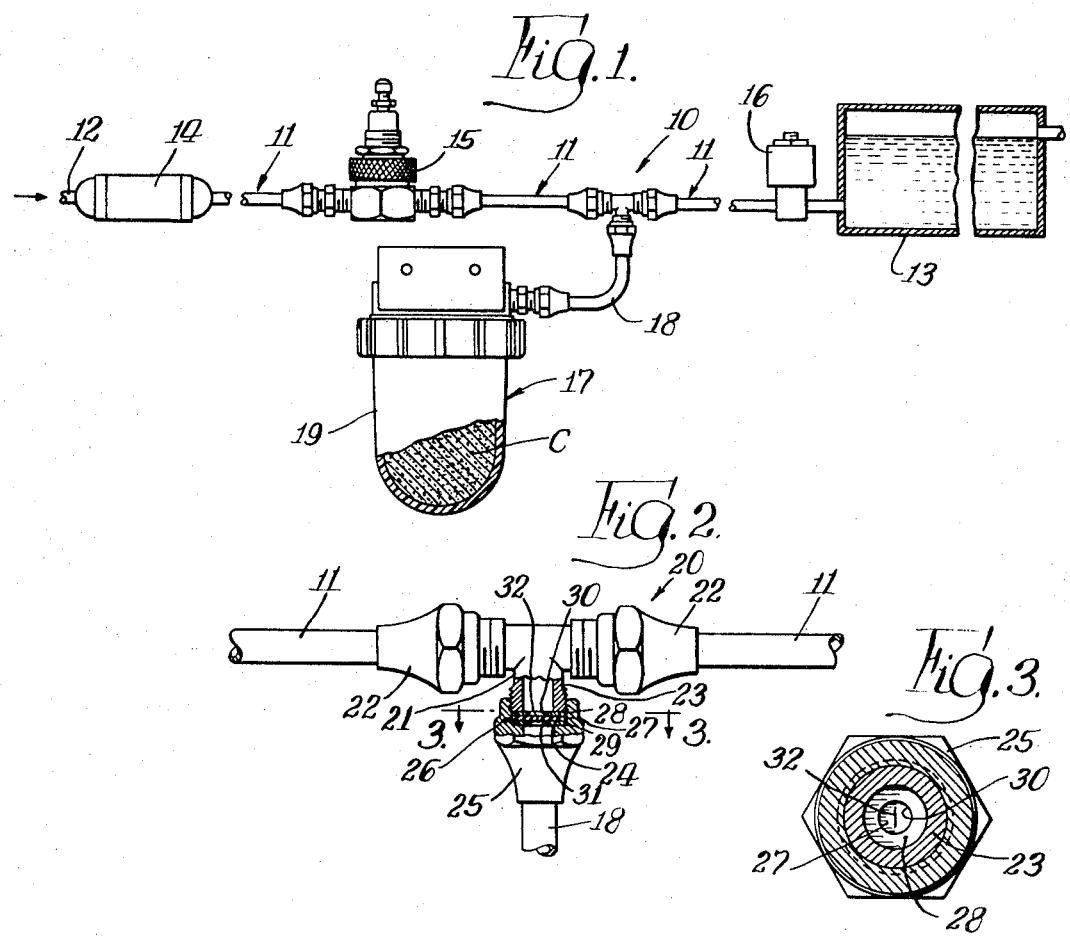
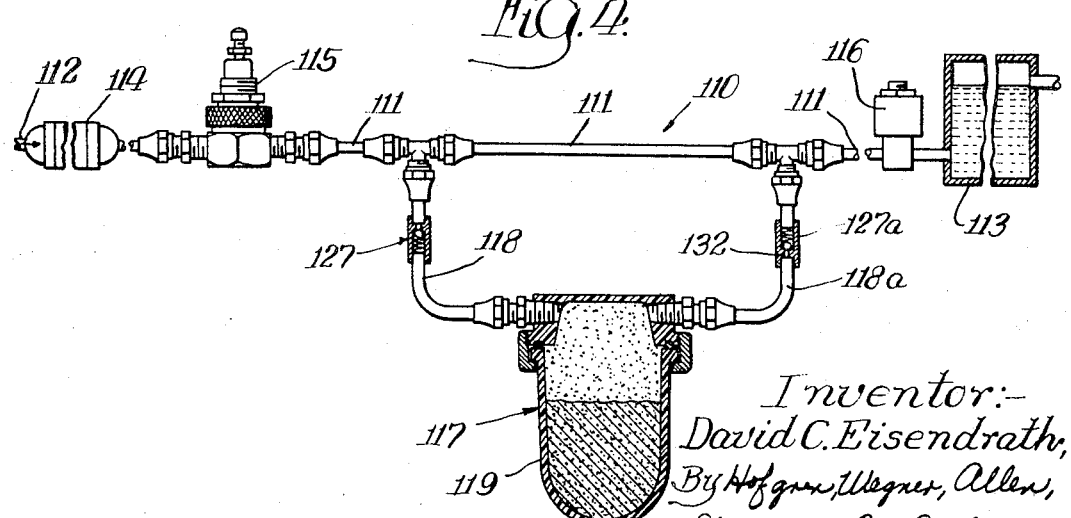
Inventor:-
David C. Eisendrath,
By Hofgren, Wegner, Allen,
Stellman & McCord Attys.

United States Patent Office 3,476,137
Patented Nov. 4, 1969

3,476,137
CONTROLLED CHEMICAL FEEDER WITH ANTIDIFFUSION MEANS
David C. Eisendrath, Chicago, Ill., assignor to Cory Corporation, a corporation of Delaware
Filed Sept. 15, 1967, Ser. No. 668,084
Int. Cl. B01f 1/00; A01c 23/00
U.S. Cl. 137—268                                                 11 Claims

ABSTRACT OF THE DISCLOSURE

A controlled chemical feeder apparatus having a fluid flow passage and a device for feeding a small quantity of chemical into the fluid flow passage as an incident of flow of fluid through the flow passage. The apparatus includes a downstream shut-off valve, and structure for preventing diffusion of the chemical into the fluid in the flow passage when the valve is closed.

---

This invention relates to fluid flow apparatus and in particular to a controlled chemical feeder apparatus.

In one conventional form of controlled chemical feeder apparatus means are provided for defining a fluid flow passage from a supply portion to a discharge portion. A valve is provided for selectively closing the flow passage at the discharge portion. A resiliently extensible means for holding a quantity of chemical to be controlledly fed into fluid flowed through the flow passage is connected thereto. The extensible means is responsive to different pressure conditions in the apparatus for selectively feeding a preselected small quantity of the chemical into the fluid each time the valve is opened. Thus, illustratively, the apparatus may comprise a water softening apparatus wherein a preselected small quantity of water softening chemical is delivered into the water flowed through the flow passage, as for use in a beverage brewer such as a coffee brewer.

Where the successive openings of the valve, and thus the deliveries of fluid through the apparatus, occur at relatively short intervals, the extensible chemical holding means may be connected directly to the fluid flow passage through a small orifice whereby effectively minimum diffusion of the chemical into the flow passage occurs through the orifice. However, it has been found that where the apparatus is unoperated for a substantial period of time, such as over a weekend, diffusion of the chemical into the fluid in the flow passage may occur whereby an undesirable relatively large amount of the chemical is fed into the fluid when the valve is opened for an initial subsequent operation of the apparatus. The present invention comprehends an improved controlled chemical feeder apparatus of the type described above having new and improved means for preventing such diffusion during such periods of nonoperation of the apparatus.

Thus a principal feature of the present invention is the provision of a new and improved controlled chemical feeder apparatus.

Another feature of the invention is the provision of such a controlled chemical feeder apparatus having new and improved means for preventing excessive delivery of the chemical.

A further feature of the invention is the provision of such a controlled chemical feeder apparatus having means defining a fluid flow passage from a supply portion to a discharge portion, a valve for closing the discharge portion, and a resiliently extensible means for holding a quantity of chemical soluble in said fluid to be fed to the discharge portion, structure comprising means defining a side passage communicating with the flow passage upstream of the valve and with the extensible holding means and means for closing the side passage when substantially no differential between the pressure in the flow passage and the pressure in the extensible holding means prevails, and for permitting flow of fluid from the flow passage to the extensible holding means when the pressure is greater in the flow passage, and for causing flow of fluid and chemical dissolved therein from the extensible holding means to the flow passage when the pressure is greater in the extensible holding means.

Still another feature of the invention is the provision of such a controlled chemical feeder apparatus wherein the side passage means comprises a slit diaphragm resiliently biased to closed condition.

A yet further feature of the invention is the provision of such a controlled chemical feeder apparatus wherein the closing means comprises a perforated rubber disc.

Still another feature of the invention is the provision of such a controlled chemical feeder apparatus wherein the closing means is disposed closely adjacent the flow passage.

A yet further feature of the invention is the provision of such a controlled chemical feeder apparatus wherein the closing means comprises a slit valve having a preselected small opening to permit only a small rate of flow of the fluid and the fluid and chemical dissolved therein in response to the pressure differentials.

Another feature of the invention is the provision of such a controlled chemical feeder apparatus wherein the side passage means comprises a pair of ducts and the closing means includes a first flow control means in one of the ducts and a second flow control means in the other of the ducts.

A yet further feature of the invention is the provision of such a controlled chemical feeder apparatus wherein the flow control means comprises check valves.

Another feature of the invention is the provision of such a controlled chemical feeder apparatus wherein the first flow control check valve permits flow only from the flow passage to the extensible holding means and the second flow control check valve permits flow only from the extensible holding means to the flow passage.

A further feature of the invention is the provision of such a controlled chemical feeder apparatus wherein means are provided for adjustably regulating the pressure of the fluid at the supply portion of the flow passage.

Still another feature of the invention is the provision of such a controlled chemical feeder apparatus wherein the closing means comprises a slit diaphragm and a pair of backup plates one each on opposite sides of the diaphragm and each having an opening therein substantially larger than the maximum opening of the slit of the diaphragm.

Other features and advantages of the invention will be apparent from the following description taken in connection with the accompanying drawing wherein:

FIGURE 1 is a broken, front elevation of a controlled chemical feeder apparatus having an antidiffusion means embodying the invention;

FIGURE 2 is a fragmentary enlarged front elevation with portions broken away illustrating the antidiffusion means;

FIGURE 3 is an enlarged horizontal section taken substantially along the line 3—3 of FIGURE 2; and FIGURE 4 is a broken, front elevation of a controlled chemical feeder apparatus having a modified form of antidiffusion means embodying the invention.

In the exemplary embodiment of the invention as disclosed in FIGURES 1, 2 and 3 of the drawing, a controlled chemical feeder apparatus, generally designated 10, is shown to comprise a conduit 11 defining a through flow passage from a supply line 12 to a tank 13. The conduit 11 is provided with a filter 14, an adjustable pressure regulator 15, and a solenoid operated valve 16. A resiliently extensible device 17 is connected to the conduit 11 through a side conduit 18. More specifically, the device 17 may include a resiliently expansible bowl portion 19 containing the chemical C to be added to the fluid flowed through conduit 11 to the tank 13, and herein illustratively comprises a water softening chemical with the fluid comprising water.

Thus, when valve 16 is closed, the pressure of the water supply 12 causes an increase in the pressure of the water in conduit 11 and the pressure causes a small quantity of water to flow into conduit 18 into the bowl 19 causing the bowl to resiliently expand. A portion of the chemical in the bowl 19 dissolves in this introduced water, and when the valve 16 is next opened, the relaxation of the pressure in the conduit 18 (and thus in bowl 19) causes the bowl to urge a small quantity of the resultant chemical solution outwardly therefrom into conduit 11 and mix with the water flowing through the conduit 11 into tank 13.

The present invention comprehends an improved means for controlling the delivery of the water through conduit 18. Thus, as shown in FIGURE 2, the connection 20 of conduit 18 to the conduit 11 includes a T-connector 21 and fittings 22 for connecting the T-connector 21 in the conduit 11. The leg 23 of the T-connector is provided with an end surface 24, and a fitting 25 is threadedly connected thereto to retain against the end surface 24, a valve structure, generally designated 26, including a slit, or perforated, rubber diaphragm 27 and a pair of back-up washers 28 and 29 at opposite sides of the diaphragm. The washers 28 and 29 are respectively provided with axial openings 30 and 31 which are larger than the maximum opening of the slit 32 in the diaphragm 27. The slit is resiliently biased to the closed position by the resilient characteristics of the rubber diaphragm so that when no pressure differential exists between the water in conduit 11 and the chemical solution in conduit 18, communication between conduit 11 and conduit 18 is prevented. Thus, during the steady state condition following the closing of valve 16, diffusion of chemical solution from conduit 18 into conduit 11 is effectively precluded.

When valve 16 is opened, the drop in pressure in conduit 11 at connector 20 permits the distended bowl 19 to contract and force a preselected small quantity of the chemical solution outwardly through the slit 32 into the conduit 11 for mixing with the water therein and delivery to the tank 13.

When the valve 16 is again closed, the pressure in conduit 11 increases to the line pressure, and a small flow of water through the slit 32 into conduit 18 results whereby a small additional amount of the chemical in bowl 19 is dissolved for subsequent delivery of chemical solution through the slit 32 upon subsequent reopening of the valve 16. In this manner, each time the valve 16 is opened, a small preselected quantity of chemical is fed into the water flowing through the conduit 11 for suitably treating the water. The valve 16 in apparatus 10 may be allowed to remain closed for extended periods of time without diffusion of the chemical solution from conduit 18 into conduit 11 by virtue of the closed valve condition of the slit diaphragm 27 occurring as soon as the pressure in bowl 19 equalizes with that in the conduit 11 after the valve 16 is closed. Thus, the quantity of chemical delivered to the tank 13 remains substantially constant independently of the length of time that valve 16 is closed, and permits the apparatus to be utilized in connection with relatively intermittently utilized brewing devices and the like.

Referring now to FIGURE 4, the modified form of controlled chemical feeder apparatus, generally designated 110, is shown to comprise an apparatus generally similar to apparatus 10, except that the side conduit means comprises a pair of conduits 118 and 118a which are connected to the conduit 111 and the upper portion of the extensible feeder device 117. In apparatus 110, a modified form of antidiffusion means is provided comprising a first check valve 127 in conduit 118 and a second check valve 127a in conduit 118a. As shown, check valve 127 is arranged to permit fluid flow therethrough in response to a pressure in conduit 111 greater than the pressure in conduit 118, and check valve 127a is aranged to permit fluid flow from conduit 118a to conduit 111 in response to a pressure in conduit 118a greater than the pressure in conduit 111. Thus, when valve 116 is closed, the increased pressure in conduit 111 causes a small quantity of water to flow through check valve 127 and conduit 118 into the feeder device 117. When the pressure in bowl 119 is equal to the pressure in conduit 111, further flow through check valve 127 is prevented, and thus diffusion of chemical solution from bowl 119 into conduit 111 is precluded. However, when the valve 116 is again opened, the decrease in the pressure in line 111 permits the distended bowl 119 to cause a flow of chemical solution from conduit 118a through check valve 127a into conduit 111 for delivery to the tank 113. Upon contraction of the bowl 119 to its normal configuration, further flow of solution through the check valve 127a is discontinued whereby only the controlled quantity of chemical is fed to the tank 113 with the water delivered through conduit 111. As in apparatus 10, the valve 116 may be maintained closed for indefinite periods of time without permitting diffusion of the chemical solution from the bowl 119 into conduit 111 whereby the delivery of chemical into the tank 113 is constant during each delivery of the water effected by the successive openings of valve 116.

The size of slit 32 of the punctured rubber diaphragm 27 and the sizes of the orifices 132 of check valves 127 and 127a are preferably preselected to provide a flow controlled delivery of the solution into the water being delivered to the tank. To further control the quantity of chemical fed by controlling the amount of expansion of the bowl 19 and the bowl 119, readily adjustable pressure regulators 15 and 115 are provided in the respective apparatus 10 and 110. Thus, in each of the apparatus, a controlled feed of the chemical solution into the delivered water is effected during the delivery of the water to the tank, while yet diffusion of the chemical solution into the through flow passage to the tank is effectively precluded when the valves 16 and 116 are closed.

I claim:

1. In a controlled chemical feeder apparatus having means defining a fluid flow passage from a supply portion to a discharge portion, a valve for closing the discharge portion, and a resiliently extensible means for holding a quantity of chemical soluble in said fluid to be fed to the discharge portion, structure comprising: means defining a side passage communicating with said flow passage upstream of said valve and with said extensible holding means; and means for closing said side passage when substantially no differential between the pressure in said flow passage and the pressure in said extensible holding means prevails, and for permitting flow of fluid from said flow passage to said extensible holding means when the pressure is greater in said flow passage, and for causing flow of fluid and chemical dissolved therein from said extensible holding means to said flow passage when the pressure is greater in said extensible holding means.

2. The controlled chemical feeder structure of claim 1 wherein said closing means comprises a slit diaphragm resiliently biased to closed condition.

3. The controlled chemical feeder structure of claim 1 wherein said closing means comprises a perforated rubber disc.

4. The controlled chemical feeder structure of claim 1 wherein said closing means is disposed closely adjacent said flow passage.

5. The controlled chemical feeder structure of claim 1 wherein said closing means comprises a slit valve having a preselected small opening to permit only a small rate of flow of said fluid and said fluid and chemical dissolved therein in response to said pressure differentials.

6. The controlled chemical feeder structure of claim 1 wherein said side passage means comprises a pair of ducts and said closing means including a first flow control means in one of said ducts and a second flow control means in the other of said ducts.

7. The controlled chemical feeder structure of claim 6 wherein said flow control means comprises check valves.

8. The controlled chemical feeder structure of claim 7 wherein said first flow control check valve permits flow only from said flow passage to said extensible holding means and said second flow control check valve permits flow only from said extensible holding means to said flow passage.

9. The controlled chemical feeder structure of claim 7 further including means for adjustably regulating the pressure of said fluid at said supply portion of said flow passage.

10. The controlled chemical feeder structure of claim 1 further including means for adjustably regulating the pressure of said fluid in said supply portion of said flow passage.

11. The controlled chemical feeder structure of claim 1 wherein said closing means comprises a slit diaphragm and a pair of backup plates one each on opposite sides of said diaphragm and each having an opening therein substantially larger than the maximum opening of the slit of said diaphragm.

References Cited
UNITED STATES PATENTS 3,060,456  10/1962  Jacobs.

HENRY T. KLINKSIEK, Primary Examiner
ROBERT J. MILLER, Assistant Examiner